United States Patent [19]

Hanson

[11] Patent Number: 5,447,071

[45] Date of Patent: Sep. 5, 1995

[54] DIRECT COUPLED PRESSURE SENSING DEVICE

[76] Inventor: Richard A. Hanson, 12921 182nd Ave. NE., Redmond, Wash. 98052

[21] Appl. No.: 991,578

[22] Filed: Dec. 16, 1992

[51] Int. Cl.⁶ .......................................... G01L 11/00
[52] U.S. Cl. ........................................ 73/704; 73/702
[58] Field of Search ................ 73/702, 704, 862.41, 73/778

[56] References Cited

U.S. PATENT DOCUMENTS

| | | | |
|---|---|---|---|
| 4,020,448 | 4/1977 | Corbet | 340/10 |
| 4,036,715 | 8/1981 | Hanson | 73/862.59 |
| 4,067,241 | 1/1982 | Corbet | 73/717 |
| 4,382,385 | 5/1983 | Paros | 73/702 |
| 4,476,725 | 10/1984 | Chorel et al. | 73/704 |
| 4,479,385 | 10/1984 | Koehler | 73/517 R |
| 4,680,970 | 7/1987 | Ueda et al. | 73/702 |
| 4,751,849 | 6/1988 | Paros et al. | 73/862.59 |
| 4,856,350 | 8/1989 | Hanson | 73/862.59 |
| 4,970,903 | 11/1990 | Hanson | 73/862.59 |

FOREIGN PATENT DOCUMENTS

| | | | |
|---|---|---|---|
| 0666446 | 6/1979 | U.S.S.R. | 73/702 |
| 1553858 | 3/1990 | U.S.S.R. | 73/702 |

*Primary Examiner*—Richard E. Chilcot, Jr.
*Assistant Examiner*—William L. Oen

[57] ABSTRACT

Pressure sensing devices which have a vibrating crystal or other load sensitive component responsive to external pressures and a reference component of the same character for outputting a signal which accurately reflects the magnitude of the external pressure and is obtained by ascertaining the difference between the sensing and reference components output signals. Preloading is employed in installing the sensing component, eliminating the need for bonding and/or mechanical connections and thereby reducing the cost of manufacturing and the potential error in output from the device. A component with a displaceable element such as a bellows or diaphragm is employed to preload the sensing component and to detect external pressure force, and provision is made for limiting the travel of the displaceable element so that the sensing of an external pressure exceeding design limits will not result in the sensing component being loaded to a level which might damage it or cause hysteresis. The reference component is mounted to a compliant support arrangement which preloads that component and subjects it to the same mechanical stiffness as the sensing component. That compensates for thermal coefficient of expansion mismatches, changing temperatures, dimensional instabilities, assembly stresses, and forces attributable to acceleration of the pressure sensing device.

19 Claims, 4 Drawing Sheets

DIRECT COUPLED PRESSURE SENSING DEVICE

TECHNICAL FIELD OF THE INVENTION

The present invention relates to novel, improved pressure sensing devices of the resonating or vibrating crystal type.

BACKGROUND OF THE INVENTION

A pressure sensor using force sensitive vibrating crystals which can be produced at low cost and used in a wide spectrum of applications has been long sought by industry. Sensors of this type would ideally have an extremely stable scale factor and bias (zero offset), low thermal sensitivity (with appropriate crystal forms), and an output in the form of a variable frequency signal—a format which is well suited for a digital environment.

The output signal from a vibrating crystal transducer is an electrical pulse train which varies in frequency as a load is applied. This form of signal is generally the easiest and most error free to convert to a digital/binary word. A frequency signal is also the easiest signal to integrate (sum over a time period). This can be done by simply counting the number of pulses in the signal over the time period.

A vibrating crystal can give a stable scale factor, which is very important. Unlike many other types of transducers, pressure transducers may experience a full scale input for long periods of time. Operating most of the time at full scale makes any changes in scale factor from the calibration value produce significant errors.

Previously developed and proposed pressure sensors of the vibrating crystal type typically have one or more potential limitations.

One potential limitation is that the bellows and diaphragm characteristics of those sensing devices are not necessarily very repeatable and stable in their deflection response to pressure. They can exhibit creep, hysteresis, and/or sensitivity to the mounting of the completed assembly and to overpressure exposure.

A second limitation common to prior art pressure sensors of the vibrating crystal type is the fairly large no-load frequency change that the single crystal typically employed in those devices undergoes as the temperature of the crystal changes. The larger the temperature sensitivity, the more precise the temperature compensation must be to achieve a given accuracy of pressure measurement.

A third potential problem is that differential thermal expansion of the device's components can increase the sensitivity of the crystal to temperature changes. This is very important as other components of the device and the materials from which they are fabricated need to meet other criteria to produce the required overall characteristics of the pressure sensing device; and an exact thermal expansion match to the crystals could accordingly cause the assembly to be deficient in some other respect.

If only one crystal is used, as is common in prior art pressure sensors of the vibrating crystal type, the accuracy of the signal frequency is very sensitive to the accuracy of the clock in the sensing device or system. This may necessitate the use of an expensive and/or large clock.

A fifth at least potential problem common to prior art devices is high sensitivity to acceleration. Pressure transducers are not necessarily placed in a known position relative to gravity in all applications. They accordingly need to be insensitive to gravity to avoid significant errors in the signals they output.

A sixth potential problem is a result of the attachment of the crystal to a pressure sensing diaphragm at one end and to a fixed member at the other. Creep in the attachment member-crystal joints can affect the high stability and accuracy typically required in those applications for which pressure sensing devices of the vibrating crystal type are supplied.

All of the just-discussed disadvantages of prior art pressure sensors of the vibrating crystal type are addressed by using a sensing crystal and a fixed reference crystal in a push-fixed arrangement and outputting a signal which is the difference between those signals generated by these two crystals. Pressure sensors using vibrating crystals are disclosed in U.S. Pat. No. 4,020,448 issued 26 Apr. 1977 to Corbett; U.S. Pat. No. 4,067,241 issued 10 Jan. 1978 to the same patentee; U.S. Pat. No. 4,382,385 issued 10 May 1983 to Paros; U.S. Pat. No. 4,479,385 issued 30 Oct. 1984 to Koehler; U.S. Pat. No. 4,751,849 issued 21 Jan. 1988 to Paros et al.; and U.S. Pat. No. 5,036,715 issued 6 Aug. 1991 to Hanson. With the exception of the devices disclosed in the Hanson patent, however, those employing a pair of load sensitive crystals have not had the features needed to take full advantage of the stability of vibrating crystals. The Hanson device avoids and accounts for the potential undesirable features of other vibrating crystal type pressure sensing devices but has the disadvantage that it does not readily lend itself to assembly by low cost, mass production techniques.

SUMMARY OF THE INVENTION

Disclosed herein are certain new and novel pressure sensing devices or transducers of the load sensitive, vibrating crystal type which employ a fixed reference crystal. These novel transducers have the advantages that they are simple, rugged, and readily assembled in quantity at low cost. They have inherently precise and stable frequency difference characteristics.

A number of novel features contribute to the stability and accuracy of the devices, to simplicity, and to ease of assembly. These include a capped or cup-shaped diaphragm assembly with the sensing crystal inside the cap and a provision for preloading the crystal within the diaphragm against a relatively stiff support to hold the crystal in place in the assembled device by preloaded contact. The resultant lack of any need for bonds or other mechanical connections between the pressure sensing crystal and the components of the device to which the crystal is attached contributes significantly to performance and cost effectiveness. This novel assembly technique makes the dimensions of the device's components much less critical and eliminates the need for complex assembly processes and operations.

Preloading is accomplished by providing a hole in the otherwise closed end of the diaphragm and employing a pin with sliding clearance through that hole to attach the cap to the sensing crystal. The position of the pin relative to the cap can be accurately determined by appropriate, simple fixturing in the assembly process.

A related novel feature of the pressure sensors disclosed herein is the provision of a pressure sensing cap diaphragm with a bushing so positioned at its center that, when the pin is attached to the cap, only negligible stress is transmitted to the thin, pressure sensing, cap of the diaphragm and localized stress are not transmitted from the diaphragm to the sensing crystal.

A third novel feature of the present invention relates to the attachment of the fixed reference crystal to one or more L-shaped flexure effect (compliant) members which preload and subject the reference crystal to substantially the same mechanical stiffness as the sensing crystal. As a consequence, any thermal coefficient of expansion mismatch between the crystals and the attachment structure has the same effect on both crystals; and the frequency difference is less affected by temperature. The same cancellation effect occurs for the inevitable dimensional instability in the structure which would otherwise cause an error if both crystals were not connected to structures with matching mechanical stiffness.

Both the sensing crystal and the reference crystal are loaded by gravitational effects on the diaphragm and on the L-shaped member(s), respectively. As a result, acceleration forces cause the frequency of the reference crystal to change in the same direction and to the same extent as the sensing crystal, canceling unwanted gravitational effects.

Also novel in the new pressure sensors disclosed herein is the use of: (a) a second, inner, cap-shaped caging member with a central bore accommodating the preloading pin 80 in combination with (b) a crystal capable of deflecting on the order of 1 mil. The inner member prevents the pressure sensing cap diaphragm from deflecting to the extent that it might damage the sensing crystal or produce hysteresis-associated inaccuracies when the outer cap is exposed to a pressure which would otherwise cause a deflection of that magnitude. Damage- or hysteresis-producing deflection is prevented by the diaphragm cap contacting the caging member around the perimeter of the bore through the caging member.

The separation between the diaphragm and caging members at or near the central bore in the caging member can be determined by a counterbore in that member or by inserting a shim of a precise thickness between the diaphragm cap and the caging member. The inner member is installed in the diaphragm cap with a spacing therebetween determined by shim thickness or the caging member counterbore depth, and the caging member is then attached to the diaphragm cap. The depth of the counterbore or the thickness of the shim provides a precise limit to the travel of the pressure sensing diaphragm cap. Under overpressure (pressure beyond the sensing range), the outer diaphragm moves inward until it touches the inner member around its center hole. The much higher stiffness or rigidity of the inner caging member prevents any substantial additional deflection of the end of the diaphragm cap and limits the stresses in the cap and compliant crystal to acceptable magnitudes.

From the foregoing, it will be apparent to the reader that one important and primary object of the present invention resides in the provision of novel, improved pressure sensing devices or transducers of the vibrating crystal type.

Other important objects of the invention, and additional features and advantages, will be apparent to the reader from the foregoing and the appended claims and as the ensuing detailed description and discussion of the invention proceeds in conjunction with the accompanying drawing.

DETAILED DESCRIPTION OF THE INVENTION

Figure 1:
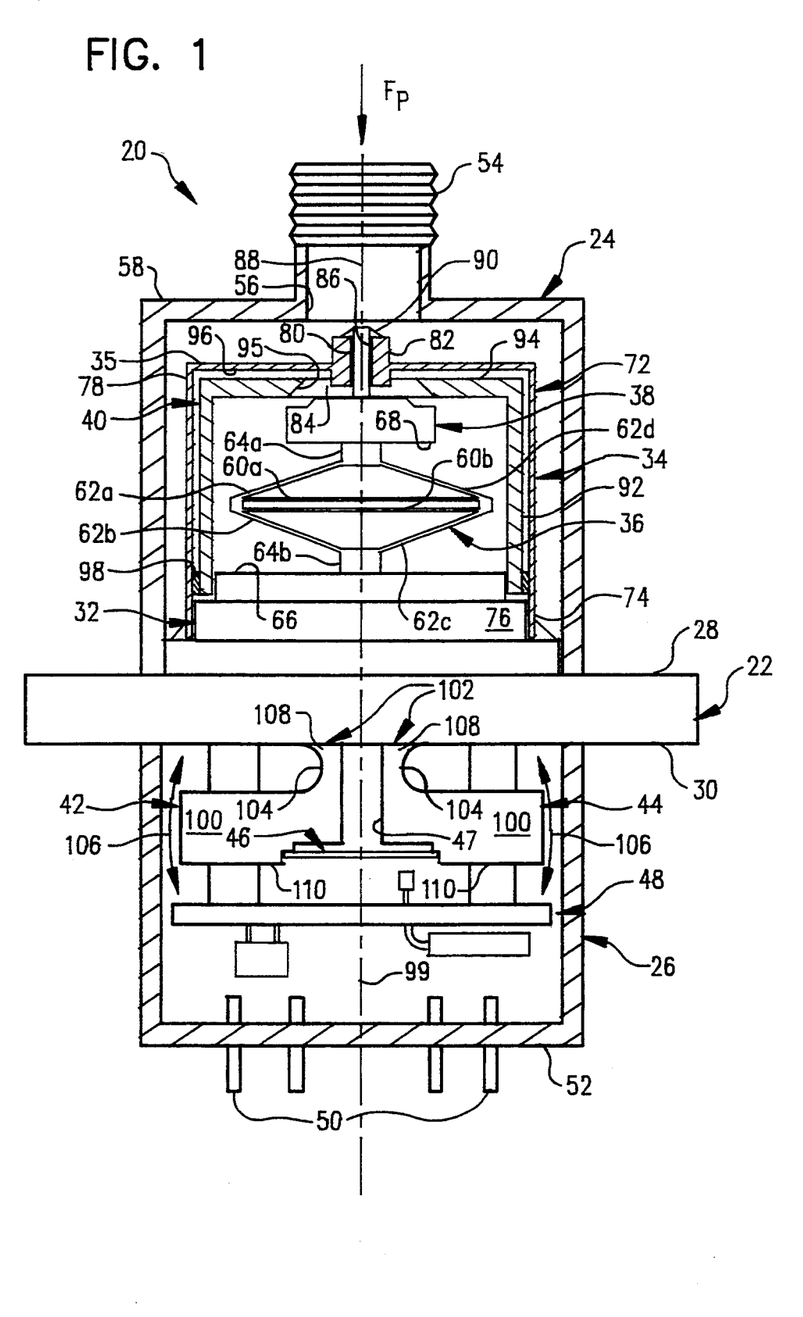
FIG. 1 is a side view of a pressure sensing device employing the principles of the present invention with certain external housings broken away to show the internal components of the device.
Figure 2:
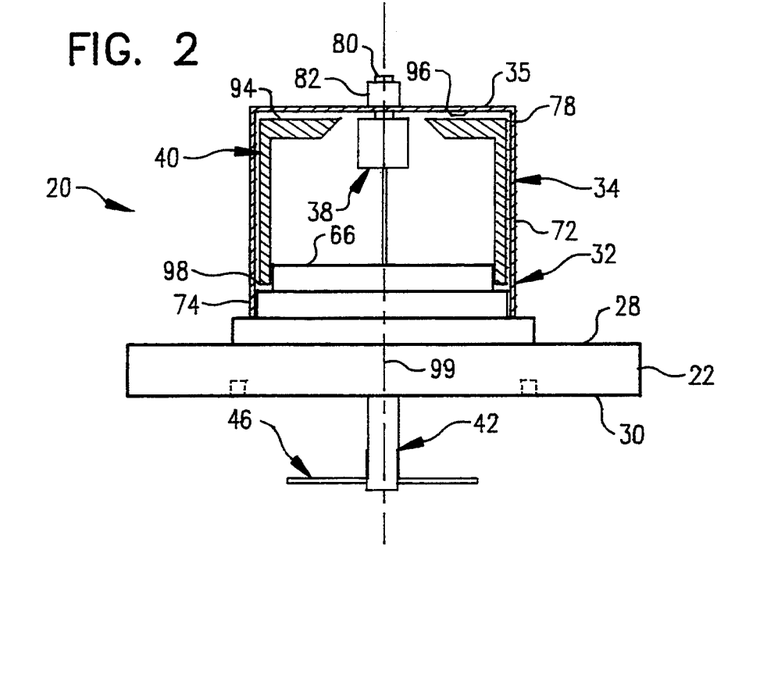
FIG. 2 is a similarly drawn, partial side view of the pressure sensing device.
Figure 3:
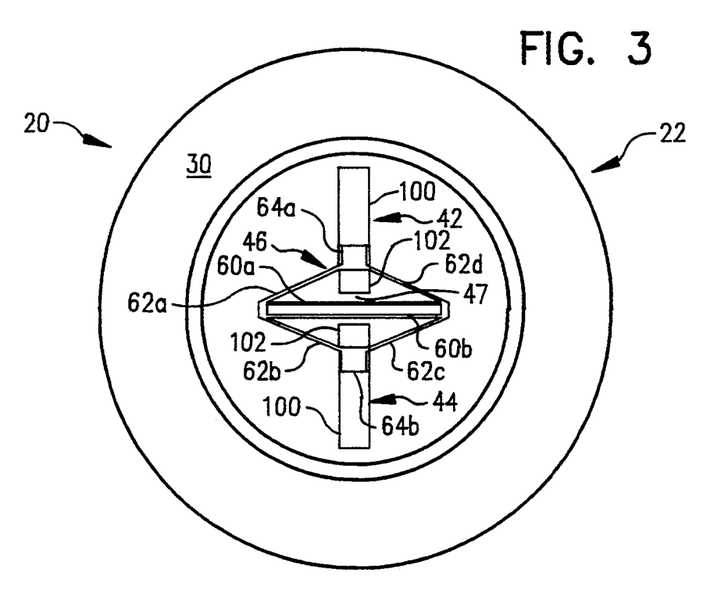
FIG. 3 is a bottom view of the pressure sensing device, again with an external housing broken away to show the interior of the device.

Referring now to the drawing, FIGS. 1–3 depicts a vibrating crystal type, pressure sensing device 20 which is constructed in accord with, and embodies, the principles of the present invention.

Orientation related designators such as top, bottom, etc. are employed extensively below in describing pressure sensing device 20 and other embodiments of the invention. These designators are employed with the assumption that the pressure sensing device being discussed is oriented as shown in the drawings. The designators are employed only in the interest of facilitating an understanding of the invention in a concise manner. They are not intended to limit the scope of the invention as defined in the appended claims.

Major components of pressure sensing device 20 include a base or mount 22 and upper and lower, protective covers 24 and 26 extending in opposite directions from the upper and lower surfaces 28 and 30 of the mount.

A three-tier, component-supporting pedestal 32 is fixed to the upper surface 28 of mount 22 within the upper protective cover 24.

Supported on pedestal 32 is a cap-type, cup-shaped external-pressure-sensing diaphragm 34 with a compliant, pressure displaceable, closed end 35. Diaphragm 34 loads a sensing component such as the illustrated, vibratable, load sensitive, electrical signal outputting crystal 36 to a level proportional to the magnitude of the external pressure detected by diaphragm 34. The crystal outputs a signal which is representative of the load placed on it by the diaphragm and, consequentially, of the diaphragm-detected pressure.

Also mounted on pedestal 32 are: a moveable coupling 38 for transmitting the motion (or displacement) of diaphragm 34 to the pressure sensing crystal 36 and thereby causing the crystal to output a pressure proportional signal and an inner cage or stop 40 which limits the travel of diaphragm 34 and coupling 38 and thereby: (a) keeps sensing crystal 36 from being stressed to a level which might damage it, and (b) limits forces in diaphragm 34 to a level below the hysteresis limit.

Fixed to the lower surface 30 of mount 22 within protective cover 26 are a pair of L-shaped, back-to-back and mirror image related, crystal supporting, compensation members 42 and 44; a reference crystal 46 mounted to the L-shaped members and spanning the gap 47 between those members; and an electronic circuit board 48. Electrical connections between the internal circuit board 48 and external components such as a power source and signal processing circuitry are made via terminals 50 which extend through the bottom wall 52 of lower cover 26.

The external pressure being measured is exerted by a fluid. The fluid pressure (vector $F_P$) is transmitted to the diaphragm 34 in the upper casing 24 of pressure sensing device 20 as by the illustrated threaded inlet fitting 54 through an aperture 56 in the top wall 58 of the device's upper housing or protective cover 24. The pressure thus exerted on diaphragm 34 displaces the diaphragm, and this motion is transmitted by moveable coupling 38 to sensing crystal 36. The pressure $F_P$ effects a displacement of diaphragm 34 proportional to the magnitude of that force vector, and it is that displacement which is measured by sensing crystal 36 in generating a signal with a frequency proportional to the fluid pressure.

Figure 6:
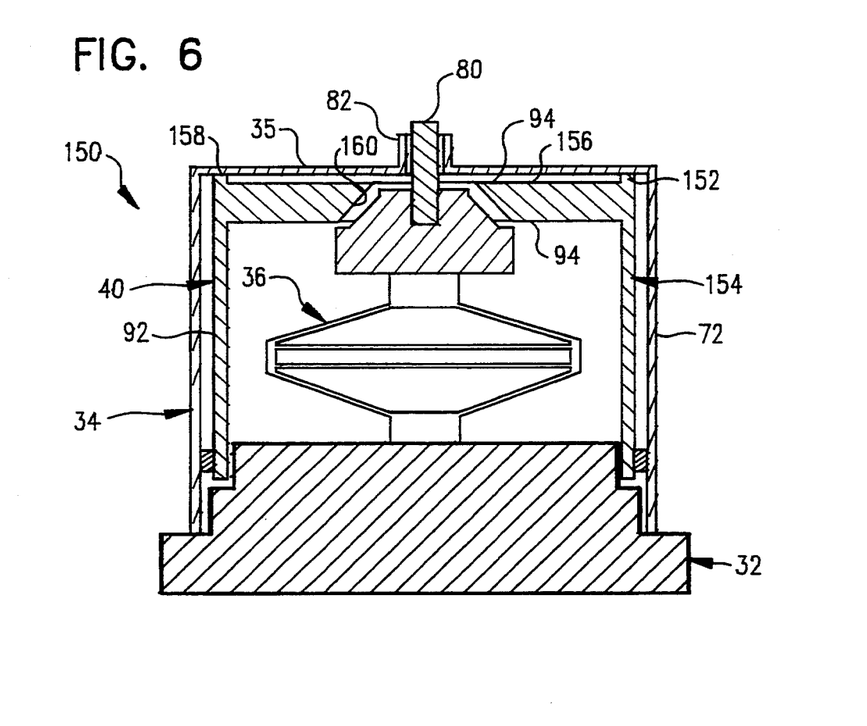
FIG. 6 is a view, similar to FIGS. 4 and 5, of yet another embodiment of the invention in which provision is made for preventing the overstressing a load sensitive crystal.

The sensing crystal 36 may be of the structure and configuration illustrated in FIG. 6 of above-cited Hanson U.S. Pat. No. 4,856,350 and described in the associated text of that patent, which is hereby incorporated in this specification by reference. Other crystals, for example that illustrated in FIG. 8 of the '350 patent, or any otherwise suitable load sensitive device such as a strain gauge can instead be employed, if desired. However, other crystals may have the disadvantage, as does the crystal disclosed in FIG. 8 of the '350 patent, that the hereinafter disclosed schemata for preventing damage to the sensing crystal by overdeflection of the pressure sensing component (diaphragm or bellows) can not be employed without a major cost penalty.

The illustrated, exemplary crystal 36 is a typically 0.008 to 0.016 in thick wafer with: (a) tines 60$a$ and 60$b$ and four rigid, elongated, integral links 62$a$–$d$ in a five-bar relationship, and (b) upper and lower mounting pads 64$a$ and 64$b$. These elements are arranged and related as described in the '350 patent to amplify or deamplify the pressure responsive displacement of diaphragm 34. Details of crystal 36 and how it functions in association with the circuitry on board 48 to generate a pressure proportional output signal are found in the '350 patent and in patents on crystal accelerator circuitry.

As is perhaps best shown in FIG. 1, sensing crystal 36 is held in place in device 20 without cost- and error-increasing bonds or mechanical connections by trapping it under load between stepped, three-tiered pedestal 32 and moveable, force transmitting coupling 38. This results in mounting pads 64$b$ and 64$a$ being held by preloaded contact against the upper surface 66 of pedestal 32 and the lower surface 68 of coupling 38.

Sensing crystal 36 is preloaded with a force of sufficient magnitude to accomplish this goal without using up the majority of the signal range of the crystal. Preloading is accomplished by: (a) displacing moveable coupling 38 toward pedestal 32 until the wanted preload has been applied to sensing crystal 36, and (b) then immobilizing coupling 38 with respect to the compliant, elastically displaceable, pressure sensing top wall or element 35 of diaphragm 34.

As is best shown in FIG. 1, diaphragm 34 also has a (typically) much stiffer cylindrical side wall 72 with an open lower end 74 which surrounds and is bonded to the second step or tier 76 of pedestal 32. The displaceable, top wall 35 of the diaphragm is integrated with side wall 72 at the upper end 78 of the side wall.

While diaphragm 34 may be comparatively stiff relative to sensing crystal 36, its pressure sensing top wall 35 may be made relatively thin so that it will respond—i.e., be displaced—by relatively small changes in the magnitude of an external pressure $F_P$.

The just-discussed method of assembling diaphragm 34 to its support isolates the external, force displaceable top wall 35 of the diaphragm from attachment stresses. These stresses might adversely affect the accuracy with which the diaphragm responds to external pressures.

Moveable coupling 38 is fixed to the displaceable, top wall 35 of diaphragm 34 by a coupling-associated pin 80 and a diaphragm-associated bushing 82. The bushing extends through an aperture 84 in diaphragm top wall 35 and is part of or bonded to the top wall in any convenient fashion such as by welding. Pin 80 is fixed to the top of moveable coupling 38 and is slideably mounted in a bore 86 extending through bushing 82.

In assembling pressure sensing device 20, pin 80 is displaced in the direction indicated by arrow 88 in FIG. 1 until the selected preload has been applied to sensing crystal 36. At that point, and with diaphragm 34 in the illustrated, relaxed, "no-load" state, pin 80 is fixed to bushing 82 as by the adhesive illustrated in FIG. 1 and identified by reference character 90. The subsequent release of the force exerted on pin 80 places on diaphragm cap 35 a stress which generates a reactive force acting in the direction of arrow 88. That force maintains the selected preload on sensing crystal 36 in the subsequent operation of pressure responsive device 20. Furthermore, bushing 82 has the advantage that it distributes the reaction stress imposed upon diaphragm top wall 35 by the preloading of sensing crystal 36. Consequently, the preloading attachment imposes only a small, negligible stress on any part of the diaphragm top wall.

Overrange caging member 40 is employed to keep an unexpectedly large magnitude external pressure $F_P$ or a too high stress in diaphragm 34 from displacing moveable coupling 38 in the arrow 88 direction to the extent that sensing crystal 36 might be damaged. Caging member 40 has a cylindrical side wall 92 concentrically surrounded by the side wall 72 of diaphragm 34 and an integral, upper or top wall 94. That wall has a central bore 95 which allows rigid coupling 38 to travel in the vector $F_P$ and opposite directions without interference and is separated under no-load conditions from the top wall 35 of diaphragm 34 by a small gap 96—typically on the order of 0.001 inch. At the lower end 98 of its side wall 92, caging member 40 is so bonded to the side wall 72 of diaphragm 34 as to provide the gap 96 of selected magnitude between the top walls 35 and 94 of diaphragm 34 and caging member 40.

The illustrated cup-shaped caging member 40 facilitates the making of the bond at the lower end 98 of the member as the bond can thereby be made at an open end of diaphragm 34. Also, the side wall 92 of the caging member partially shields sensing crystal 36 from heat emanating from diaphragm side wall 72 and shunts the heat toward reference crystal 46. This promotes accuracy by tending to keep the two crystals at the same temperature. Furthermore, no joints need be made close to the critical, pressure sensing, compliant top wall 35 of the diaphragm; and this is important as stressing of that wall could cause signal errors. Instead, the only contact with the sensitive portion of the diaphragm top wall 35 is at a flat surface during overpressure exposure, and that is nondamaging.

With a gap 96 of appropriate magnitude, diaphragm top wall 35 can move in the arrow 88 direction and in the opposite direction to an extent appropriate to the range of pressures which device 20 is designed to sense. A larger magnitude pressure—specifically one capable of causing damage to sensing crystal 36—will result in diaphragm top wall 35 coming into contact with caging member top wall 94 and being halted before a stress of unacceptable magnitude is imposed on the crystal or on diaphragm 34.

Referring now to FIGS. 1 and 3, it was pointed out above that a reference crystal 46 is employed to increase the accuracy of pressure sensing device 20 and that the reference crystal spans the gap 47 between, and is mounted to, the L-shaped compensation members 42 and 44 on the bottom side 30 of pressure sensing device base 22.

The circuitry on board 48 will generally include two separate oscillators (not shown) which cause both sensing crystal 36 and reference crystal 46 to vibrate at no-load frequencies of around 10,000 Hz. An external pressure with a vector $F_P$ acting in the direction of the pressure device's longitudinal centerline 99 as detected by diaphragm 34 and transmitted by displacement of diaphragm top wall 35 to sensing crystal 36 by coupling 38 causes a change in the frequency at which the crystal vibrates. The new frequency is proportional to the magnitude of the pressure.

There are several benefits to using two crystals arranged like sensing crystal 36 and reference crystal 46 and employing the difference between the signals outputted by the crystals as the frequency signal indicative of the external pressure measured by device 20. If a shift in the sensing crystal frequency occurs, the change in the frequency difference will only be the initial difference frequency times the shift in the clock frequency. Without the reference crystal, any clock frequency shift is multiplied by the inverse of the ratio of the frequency change in the sensing crystal at full scale times the no-load frequency; and this is much less accurate.

For example, if a single crystal has a no-load frequency of 10,000 Hz and a full scale frequency change of 1,000 Hz, a 10 parts per million (ppm) change in the clock frequency produces a no-load apparent frequency change of 0.1 Hz. Since full scale is 1,000 Hz, the no-load pressure signal has an apparent change of 0.1/1,000 or 100 ppm (0.01% of full scale). The clock error effect is magnified.

If, on the other hand, there is a reference crystal fixed at 10,000 Hz, the frequency difference signal is unchanged at no-load full scale; and, if one crystal is vibrating at 11,000 Hz and the other at 10,000 Hz, the difference is 1,000 Hz with the same clock shift. One frequency will seem to be 11,000.11 Hz and the other 10,000.10 Hz, a difference of 1,000.01 Hz. A frequency difference of 0.01 Hz is 10 ppm of full scale, and the clock error is not magnified, even when the transducer is operated at full scale, by imposition of the maximum pressure it is designed to detect on pressure sensing diaphragm element 35. At zero load, the situation is even better since the clock change produces almost no zero load error.

Referring still to FIGS. 1 and 3, the L-shaped compensation members 42 and 44 which support reference crystal 46 from the base 22 of device 20 each have a relatively long, rectangular sectioned, free leg 100 orthogonally oriented relative to vector $F_P$ and centerline 99 and an integral, shorter, necked down and more flexible or compliant leg 102 with an arcuate indentation 104. This necked down configuration increases the compliance of L-shaped members 42 and 44 and allows their longer legs 100 to flex in the directions indicated by arrow 106 in FIG. 1 in a manner which effects accurate cancellation of acceleration forces having vectors congruent with the longitudinal axis or centerline 99 of pressure sensing device 20.

Members 42 and 44 are located on opposite sides of, and are equally spaced from, device centerline 99. The longitudinal axes of the legs parallel the direction of displacement of diaphragm cap 35 by the external pressure $F_P$, i.e., the direction indicated by arrow 88 (centering is not critical). The ends 108 of legs 102 can be fitted into slots (not shown) opening onto the lower side 30 of platform 22; or the legs can be integral elements of the platform. The connections between legs 102 and the platform are not critical except for the need to have a good thermal connection.

Reference crystal 46, best shown in FIG. 3, will typically be identical to sensing crystal 36; and the same reference characters are accordingly employed herein to identify the corresponding elements of the two crystals.

As is shown in FIG. 3, the pads 64a and 64b of reference crystal 46 are respectively connected to the lower side 110 of the longer leg 100 of L-shaped, crystal-supporting member 42 and in the same manner to the bottom side 110 of leg 44 with the tines 60a and 60b of the crystal at equal distances from centerline 99.

Reference crystal 46 is preloaded to approximately the same level as sensing crystal 36. This may be accomplished by snap fitting the pads 64a and 64 b of the reference crystal into slots (not shown) in the legs 100 of support members 42 and 44, thereby allowing legs 100 to apply the wanted compressive preload to the reference crystal.

The reference crystal supporting members 42 and 44 and diaphragm 34 are dimensioned and otherwise so fabricated, and the two crystals 50 orthogonally related as shown in FIG. 1, that the combined compliance of the two reference crystal supporting members equals the compliance of the diaphragm.

The effect of approximately matching preloading and compliance is important. Specifically, any mismatch between the crystal and the structure to which it is attached attributable to a thermal coefficient of expansion has the same effect on both the sensing and reference crystals. Therefore, the frequency difference of these two crystals, and hence the accuracy of the pressure sensing device, is less affected by temperature. The matched compliance also cancels or compensates for inevitable dimensional instabilities in pressure sensing device 20. This is important because such instabilities would cause significant errors if the sensing and reference crystals were not connected to structures with substantially matched mechanical stiffnesses.

Furthermore, legs 100 of L-shaped supports 42 and 44 respectively flex in the counterclockwise and clockwise directions when pressure sensing device 20 is accelerated in the direction indicated by arrow 88 in FIG. 1 or accelerated in the opposite direction. This so changes the loading on reference crystal 46 as to cancel the effect of acceleration in these directions, maintaining the accuracy of pressure sensing device 20 under acceleration conditions (device 20 is insensitive to acceleration in directions normal to arrow 88 when two L-shaped members are employed as shown in the drawings). If that is not critical, a single L-shaped member and a stiff or rigid reference crystal support can be used.

As will be apparent to the reader from the foregoing and FIG. 1, sensing crystal 36 and reference crystal 46 are connected to a common base (identified by reference character 22) in an orthoganal relation and in relatively close physical proximity. The result is that the sensing and reference crystals tend to stay at the same temperature, eliminating those inaccuracies which would occur if the two crystals were not maintained at the same temperature.

Figure 4:
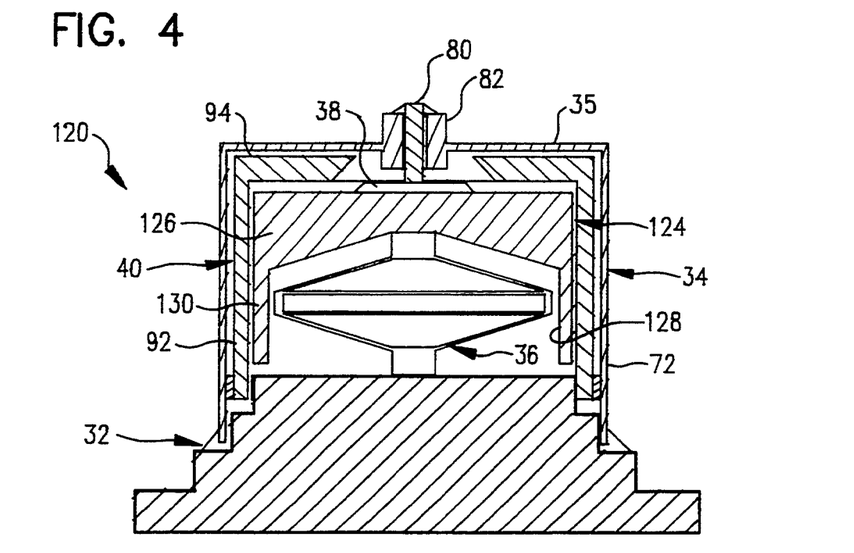
FIG. 4 is a partial side view of the same character as FIG. 1; this view shows a second embodiment of the invention in which provision is made for protecting a pressure sensing crystal against accuracy-affecting temperature changes.

Even less susceptible to temperature differential appurtenant errors, especially those attributable to rapid temperature changes, is the pressure sensing device illustrated in FIG. 4 and identified by reference character 120 (to the extent that the components of pressure sensing devices 20 and 120 are alike, they are identified in the drawings by the same reference characters).

The primary difference between the two pressure sensing devices is the addition to device 120 between coupling pin 80 and sensing crystal 36 of a heat sink 124. This component has a thermal mass 126 large enough to absorb heat from diaphragm 34 to an extent effectively isolating sensing crystal 36 from rapid changes of temperature.

Heat sink 124 may be disc-shaped or have the illustrated cup shape with a cavity 128 which defines a depending, cylindrical side wall 130 surrounding sensing crystal 36. Heat sink 122 is made with as much thermal capacity (ability to absorb BTU's with minimal temperature change) as possible.

The heat coming from the fluid sensed by device 120 fluid reaches thermal mass 126 from the circular pin 80 which couples sensing crystal 36 to diaphragm 34. Pin 80 acts as a thermal resistance element and slows the flow of heat into thermal mass 126 from pressure sensing, fluid-contacted diaphragm 34. Mass 126 absorbs most of the heat before it reaches sensing crystal 36, further significantly slowing the rate of temperature change of the sensing crystal.

The shape and dimensions of thermal mass 126 are determined by the overall design of pressure sensing device 120 including the pin 80 dimensions, the diaphragm 34 dimensions, the base 22 dimensions, and the thermal properties of the materials in those components. The optimum design is one where the sensing crystal 36 and reference crystal 46 remain at the same temperature when the diaphragm 34 is subjected to a fluid which is at a different temperature from the overall pressure sensor/transducer 120.

Of importance, in conjunction with the foregoing, is the thermal insulation gap 96 between pressure sensing, fluid contacted, diaphragm top wall 35 and overrange cage 40 and the thermal insulation gap 132 between the latter and heat sink 124. These gaps also isolate load sensitive crystal 36 from rapid temperature changes.

Numerous other modifications may be made and alternatives employed without exceeding the scope of the present invention.

One such representative modification involves the substitution of a pressure bellows for the illustrated capped diaphragm 34. Also, a pressure or other force which has a vector $F_P$ and is applied to pin 80 can be correctly measured.

Figure 5:
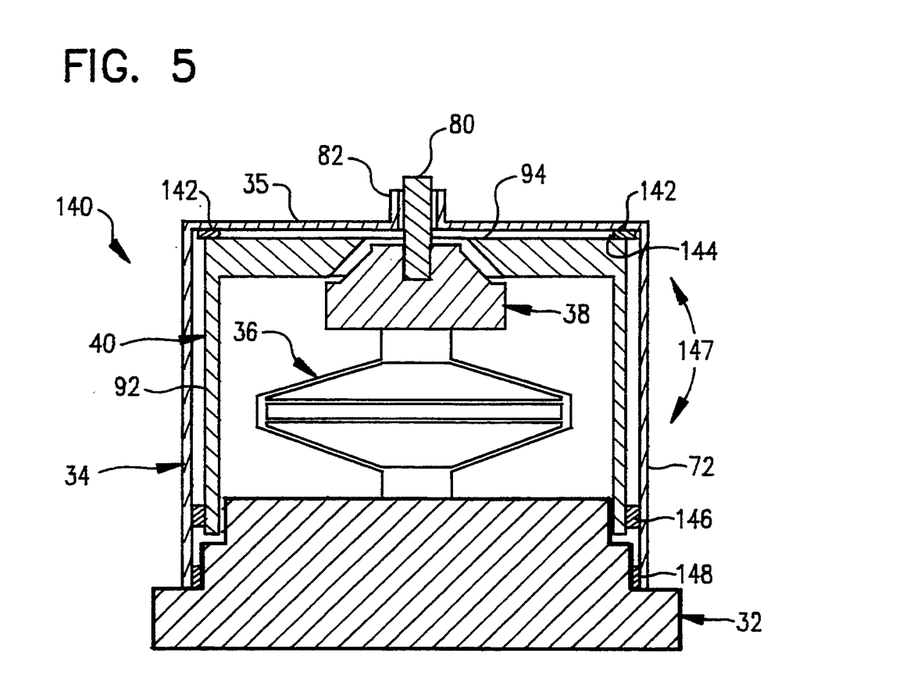
FIG. 5 is a view like FIG. 4 of a third embodiment of the invention with an alternate arrangement for preloading a pressure sensing crystal with an external-force-displaced diaphragm.

Yet another, and important, embodiment of the invention is illustrated in FIG. 5 and identified by reference character 140. This device uses a shim 142 to space overrange cage top wall 94 from the elastically displaceable, pressure sensing element 35 of diaphragm 34. Shim 142 determines the width w of gap 96, thereby limiting the maximum travel of element 35 toward sensing crystal 36 and, consequentially, the load that can be imposed on the crystal.

Shim 142 is a flat, washerlike component of substantially the same outer diameter as overrange cage top wall 94. The shim has a large diameter central bore 144 which allows displaceable diaphragm element 35 to move in the vector $F_P$ direction until it is stopped by overrange cage top wall 94 at the locus of the periphery of central bore 95.

In assembling pressure sensing device 140, shim 142 is installed between diaphragm 34 and overrange cage 40. The three components are then clamped together, and bond 146 is formed between diaphragm and caging member side walls 72 and 92 to produce a diaphragm-shim-cage assembly 147 with a displacement-limiting gap 96 of fixed width between the rigid or stiff cage top wall 94 and the compliant, displaceable diaphragm element 35. Then, assembly 146 is installed on base 22; the bond 148 between diaphragm side wall 72 and base 22 is formed; and sensing crystal 36 is placed under the selected preload.

FIG. 6 discloses a pressure sensing device 150 which uses an annular, centrally apertured, integral shoulder 152 on inner cage member 154 instead of a shim to provide a displacement limiting gap 96 of selected width $w_1$ between cage member rigid upper wall 94 and external-pressure $F_P$-displaceable diaphragm element 35. By virtue of shoulder 152, inner cage member 154 has a recess or counterbore 156 opening onto its top side 158. Diaphragm top wall 35 can be displaced into this counterbore by an external pressure with overtravel being prevented by top wall 35 contacting the bottom of counterbore 156 at the locus of the central opening 160 through caging member top wall 94. This arrangement has the advantage of simplicity—elimination of a component and assembly steps—albeit with some sacrifice in the latitude afforded by the ability to use shims of different thicknesses to provide diaphragm-to-cage gaps $w_1$ of different thicknesses on a device-to-device basis.

Still other embodiments of the invention use a strain gauge as the load sensitive component in place of a sensing crystal of the character disclosed above.

The invention may be embodied in still other forms without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A pressure sensing device which comprises:
   a load sensitive means with an electrical output which varies as the load thereon changes, said means having a fixable end and a displaceable end;
   a support at the fixable end of said load sensitive means; and
   means at the displaceable end of the load sensitive means for so applying and thereafter maintaining a selected magnitude preload on said means as to bias the load sensitive means against the support and thereby maintain said load sensitive means in assembled relationship with said support.

2. A device as defined in claim 1 in which the load sensitive device is a crystal which can be vibrated by the application of an electrical signal thereto.

3. A pressure sensing device which comprises:
   a load sensitive means with an electrical output which varies as the load thereon changes, said means having a fixable end and a displaceable end;
   a support for immobilizing the fixable end of said load sensitive means;
   a pressure sensing means displaceable by application of an external pressure thereto; and
   means for coupling the displaceable end of said load sensitive means to said pressure sensing means, said coupling means comprising a means which is displaceable relative to and cooperates with said pressure sensing means to preload said load sensitive means and means for thereafter immobilizing said preloading means relative to the sensing means.

4. A device as defined in claim 1 which has:
   a component with an external-pressure-displaceable element having a relaxed, no-load configuration;
   a rigid coupling means for transmitting motions of the displaceable element to the load sensitive means; and
   means so fixing said coupling means to said displaceable element as to displace and stress said element, causing said element to generate a reactive force which is transmitted through the coupling means to preload said load sensitive means as aforesaid.

5. A device as defined in claim 4 which comprises means for isolating said rigid coupling means from localized stresses in said displaceable element.

6. A device as defined in claim 4 which includes means for distributing over said displaceable element forces imposed thereon by the preloading of the load sensitive means.

7. A pressure sensing device which comprises:
   a load sensitive means with an electrical output which varies as the load thereon changes, said means having a fixable end and a displaceable end;
   a support at the fixable end of said load sensitive means;
   a pressure sensing means displaceable by application of an external pressure thereto; and
   means for coupling said load sensitive means to said pressure sensing means, said coupling means comprising a bushing assembled to said pressure sensing means, a rigid coupling means which is displaceable relative to said bushing, a means which is displaceable with said rigid coupling means relative to said bushing, and means for immobilizing said displaceable means relative to the bushing to thereby preload said load sensitive means.

8. A device as defined in claim 7 in which the means displaceable with the coupling means is rectilinearly slidable in the bushing toward and away from the load sensitive means.

9. A pressure sensing device which comprises:
   a cup-shaped assembly comprising a load sensitive means with an electrical output which varies as the load thereon changes;
   a support for said load sensitive means; and
   precompression means for applying and thereafter so maintaining a selected magnitude preload on said load sensitive means as to bias said load sensitive means against said support and thereby maintain said means in assembled relationship with the support;
   said support and said precompression means having spaced apart surfaces engageable by said load sensitive means and said means being trapped between said surfaces.

10. A pressure sensing device which comprises:
    a load sensitive means with an electrical output which varies as the load thereon changes;
    a support for said load sensitive means; and
    precompression means for so applying and thereafter maintaining a selected magnitude preload on said load sensitive means as to bias said load sensitive means against said support and maintain said means in assembled relationship with the load sensitive means, said precompression means including a member which: (a) is slidable along a rectilinear path toward the load sensitive means, and (b) can be fixed once the selected magnitude preload has been imposed on said means.

11. A pressure sensing device which comprises:
    a support;
    a load sensitive means mounted to said support, said means having the capability of outputting an electrical signal which changes with the load imposed thereon;
    a pressure responsive means which is deflectable to an extent proportional to the magnitude of an external pressure imposed thereon; and
    a rigid motion transmitting link connected between said load sensitive means and said pressure responsive means, said link being so positionable relative to pressure sensing means in the assembly of said device as to cause said pressure sensing means to impress and maintain a preload of a selected magnitude on said load sensitive means.

12. A device as defined in claim 11 in which:
    the pressure responsive means has an elastically deformable element; and
    said device also includes means interposed between the load sensitive means and the elastically deformable element of the pressure responsive means for establishing precise distances between the components of the pressure sensing device.

13. A device as defined in claim 12 in which the interposed means can be displaced relative to said elastically deformable element and then fixed relative to said element for displacement therewith.

14. A pressure sensing device which comprises:
    a support;
    a transducer means mounted to said support, said means comprising a load sensitive sensing crystal and a reference crystal and having the capability of outputting an electrical signal which changes with the load imposed on the sensing crystal;
    a pressure responsive means which is deflectable to an extent proportional to the magnitude of an external pressure imposed thereon; and
    support means to which the sensing and reference crystals are held by preloading, the mechanical stiffness of the support means at the loci of attachment to the sensing and reference crystals being such that loads of substantially the same magnitude are applied to the sensing and reference crystals when the sensing crystal means is preloaded and as the effects of time and temperature on the sensing device are seen by the crystals.

15. A method of assembling a pressure sensing device comprising a cup-shaped load sensitive means for outputting an electrical signal with a magnitude proportional to that of a sensed external pressure, said method comprising the steps of:

installing said load sensitive means between a support means and a load transmitting member employed to so bias said load sensitive means against said support as to maintain said load sensitive means in assembled relationship with the support without mechanical connection thereto;

affixing a pressure responsive means comprising an element which is elastically deflectable to an extent proportional to the magnitude of an external pressure in a selected relationship to the assembly of load sensitive means and compliant support means; and so connecting said load transmitting member to said elastically deflectable element as to impose and maintain the preload of selected magnitude on said load sensitive means.

16. A method as defined in claim 15 in which the load transmitting member is connected to the elastically displaceable element by displacing said member toward the load sensitive means under no-load conditions until the selected preload is seen by said means and then affixing the load-transmitting element to said displaceable element.

17. A method of assembling a pressure sensing device comprising a load sensitive means for outputting an electrical signal with a magnitude proportional to that of a sensed external pressure, said method comprising the steps of:

installing said load sensitive means between a support means and a load transmitting member employed to so bias said load sensitive means against said support as to maintain said load sensitive means in assembled relationship with the support without mechanical connection thereto;

affixing a pressure responsive means comprising an element which is elastically deflectable to an extent proportional to the magnitude of an external pressure in a selected relationship to the assembly of load sensitive means and compliant support means; and so connecting said load transmitting member to said elastically deflectable element as to impose and maintain the preload of selected magnitude on said load sensitive means; and so mounting a reference means to said support by a compliant mounting means and so preloading said reference means as to: (a) compensate for thermal coefficient of expansion mismatches, dimensional instabilities,-and/or effects of acceleration of the load sensitive means; and (b) consequentially allow an accurate, pressure-representing signal to be outputted by ascertaining the difference between the signals outputted from the load sensitive and reference means.

18. A method of assembling a pressure sensing device comprising a load sensitive means for outputting an electrical signal with a magnitude proportional to that of a sensed external pressure, said method comprising the steps of:

installing said load sensitive means between a support means and a load transmitting member employed to so bias said load sensitive means against said support as to maintain said load sensitive means in assembled relationship with the support without mechanical connection thereto;

affixing a pressure responsive means comprising an element which is elastically deflectable to an extent proportional to the magnitude of an external pressure in a selected relationship to the assembly of load sensitive means and compliant support means; and so connecting said load transmitting member to said elastically deflectable element as to impose and maintain the preload of selected magnitude on said load sensitive means; and so locating a travel limiting component in the path of the elastically deflectable element as to limit the displacement of said element to a magnitude which will prevent overstressing of the load sensitive means.

19. A pressure sensing device which comprises: a load sensitive means with an electrical output which vairies the load theron changes;

a displaceable, pressure sensing means;
a support for the load sensitive means;
means comprising said pressure sensing means for so applying and thereafter maintaining a selected magnitude preload on said load sensitive means as to bias the load sensitive means against the support and thereby maintain said load sensitive means in assembled relationship with said support; and
a means assembled to or integrated with said displaceable pressure sensing means for distributing over said displaceable means loads generated by the preloading of load sensitive means.

* * * * *